US006032537A

United States Patent [19]

McLaren

[11] Patent Number: 6,032,537

[45] Date of Patent: Mar. 7, 2000

[54] SAFETY BLEED ASSEMBLY FOR A HYDRAULIC SYSTEM

[76] Inventor: Rory McLaren, 7050 Cherry Tree La., Salt Lake City, Utah 84121

[21] Appl. No.: 09/251,189

[22] Filed: Feb. 17, 1999

Related U.S. Application Data

[63] Continuation of application No. 08/819,092, Mar. 18, 1997, abandoned.

[51] Int. Cl.[7] .......... G01L 7/00

[52] U.S. Cl. .......... 73/756

[58] Field of Search .......... 73/700, 706, 714, 73/756, 37, 40, 40.5 R, 40.7, 46

[56] References Cited

U.S. PATENT DOCUMENTS

| | | |
|---|---|---|
| 2,547,377 | 4/1951 | DeJuhasz . |
| 3,233,462 | 2/1966 | Kuter et al. . |
| 3,771,365 | 11/1973 | Schempp . |
| 4,727,753 | 3/1988 | Baumann et al. . |

*Primary Examiner*—William Oen

*Attorney, Agent, or Firm*—M. Reid Russell

[57] ABSTRACT

The invention in a safety bleed assembly includes a body wherein intersecting passages are formed that mount in ends thereof, respectively, a pressure gauge, and ports with check valves and ports alone. The ports with check valves function as high pressure ports and are for connection through lines or hoses to high pressure check/bleed connectors that have been mounted in lines or hoses of a section or sections of a hydraulic system that may remain under pressure after the hydraulic system has been shut down, and the ports without check valves function as low pressure ports that are for connection through lines or hoses to low pressure check/bleed connectors that have been mounted in lines or hoses of a section or sections of the hydraulic system that are at zero or low pressure when the hydraulic system has been shut down, with fluid passed through the safety bleed assembly of the invention to travel from high to low pressure ports. The high and low pressure ports, respectively, are each preferably color coded, as for example, red for high pressure and blue for low pressure, and sealing caps are provided for closing off the ports when a port is not connected to a line or hose that connects to a check/bleed connector.

6 Claims, 5 Drawing Sheets

SAFETY BLEED ASSEMBLY FOR A HYDRAULIC SYSTEM

This application is a continuation of Ser. No. 08/819,092 filed Mar. 18, 1997, now abandoned.

BACKGROUND OF THE INVENTION

1. Field of the Invention

The invention relates to line bleed safety arrangements for hydraulic systems and in particular to devices for providing a safe release of stored hydraulic energy.

2. Prior Art

It is a well known hazard to mechanics and technicians performing servicing or maintenance of a hydraulic system that fluid under pressure is very dangerous. Incidents involving serious injury from a hydraulic leak are well known, such as when a mechanic or technician inadvertently runs his hand over a leaking fitting severing a finger or fingers, or bodily injuries as occur when a system line under high pressure is opened, spraying fluid against the mechanic or technician's skin. Numerous such incidents have occurred in which a mechanic or technician has released stored hydraulic energy from a line that was believed to be at low or atmospheric pressure. Certainly a better way than the common practice of "cracking a connector" to release pressure is needed. The present invention provides a device for meeting this need that affords the mechanic or technician with a closed-loop pressure bleed capability.

Heretofore a number of different configurations of devices and gauges have been provided for sensing and measuring a presence of fluid under pressure and examples of such are shown in patents to Kuter et al, U.S. Pat. No. 3,233,462; to Schempp, U.S. Pat. No. 3,771,365 and to Baumann, et al., U.S. Pat. No. 4,727,753 with a check valve device shown in a patent to DeJuhasz, U.S. Pat. No. 2,547,377, that is for connecting a pressure sensing devices into a hydraulic system line. Such systems and arrangement, unlike the present invention, when installed, may alert a mechanic or technician to a presence of high pressure, but they have not provided, as does the present invention, for a safe and reliable system for conveniently releasing system pressure and to bleed fluid back to a system reservoir, or the like, to avoid a loss of hydraulic fluid from the system.

SUMMARY OF THE INVENTION

It is a principal object of the present invention in a safety bleed assembly to provide a device for connecting through pressure lines or hoses to check/bleed connectors that have been previously installed in lines of a hydraulic system for safely relieving any trapped pressure from which lines prior to opening the system.

Another object of the present invention in a safety bleed assembly is to provide a hand held device that is arranged for connection through lines to check/bleed connector installed in lines or hoses of a hydraulic system that may be under pressure to both determine a presence of pressure in the system and to vent such pressurized hydraulic fluid as is found in individual system sections back to a hydraulic system reservoir.

Still another object of the present invention in a safety bleed assembly is to provide a device for attachment into individual lines of a hydraulic system that includes accumulators; counterbalance valves; pilot-operated check valves; actuators, and the like.

Still another object of the present invention in a safety bleed assembly is to provide a device that is easy to use and preferably incorporates an arrangement of color coded check valves and ports whereto are connected ends of passages formed in a body of the hand held pressure/bleed assembly, the color coding to indicate that the individual port is for coupling to either a high or low pressure line, respectively, and the ports are, in turn, for connection through lines or hoses to check/bleed connectors that have been fitted into hydraulic system lines or hoses that are under pressure, for use in relieving of system pressure and to drain hydraulic fluid therefrom back to a system reservoir.

Principal features of the safety bleed assembly of the invention include a hand held pressure/bleed body wherein is formed at least one and preferably a pair of crossing passages that open at the body sides and ends. A pressure gauge is connected into one passage end to receive and indicate pressure as is present in the body, and at least one of the passage ends is fitted with a high pressure quick connect port for connection through a line or hose to through a check/bleed connection mounted in a hydraulic system high pressure line, and at least one other passage end is fitted with a low pressure quick connect port for connection to a line or hose to vent fluid from the assembly housing back into a low pressure line of the hydraulic system that ultimately vents to a system reservoir. Preferably, a pair of high pressure quick connect ports are fitted into passage ends that each also include a check valve mounted alongside each of the quick connect ports. The high pressure quick connect ports are preferably arranged along one side of the body and a pair of low pressure quick connect ports are mounted alongside one another in the other body side. Additionally, a third high pressure quick connect port with a check valve is preferably fitted in an end of a passage exiting the bottom of the body. The respective low and high pressure quick connect ports are each preferably color coded, as, for example, the high pressure ports are painted red and the low pressure ports are painted blue. Such color coding is to preclude a misattachment of a high pressure line or hose to a low pressure port.

With all the other ports capped, for bleeding a hydraulic system, a pressure line or hose is first connected to a low pressure port and into a check/bleed connector that is located in a low pressure line of the hydraulic system. Thereafter, a pressure line or hose end that has not been connected into the hydraulic system is connected into a high pressure port of the assembly that is either a red bottom port or one of the red side high pressure ports and the other line or hose end is then connected into a check/bleed connector that is arranged in a high pressure line of the hydraulic system. In which connection the connector is opened by operation of a valve release to pass fluid under pressure therefrom that travels into and through the assembly body, exiting the low pressure port. The high pressure ports each include a check valve that prohibits a back flow. Whereas the low pressure ports are open and must be capped when not in use. However, while the high pressure port or ports each contain a check valve prohibiting back flow, such port, when not in use, should be capped, to prohibit a flow of fluid therefrom. The connection arrangement for both low and high pressure lines of the hydraulic system is preferably through individual check/bleed connectors, each of which is essentially a one way valve, that has previously been installed in critical portions or sections of the hydraulic system.

DESCRIPTION OF THE DRAWINGS

In the drawings that represent the best mode presently contemplated for carrying out the invention.

DETAILED DESCRIPTION

Figure 1:
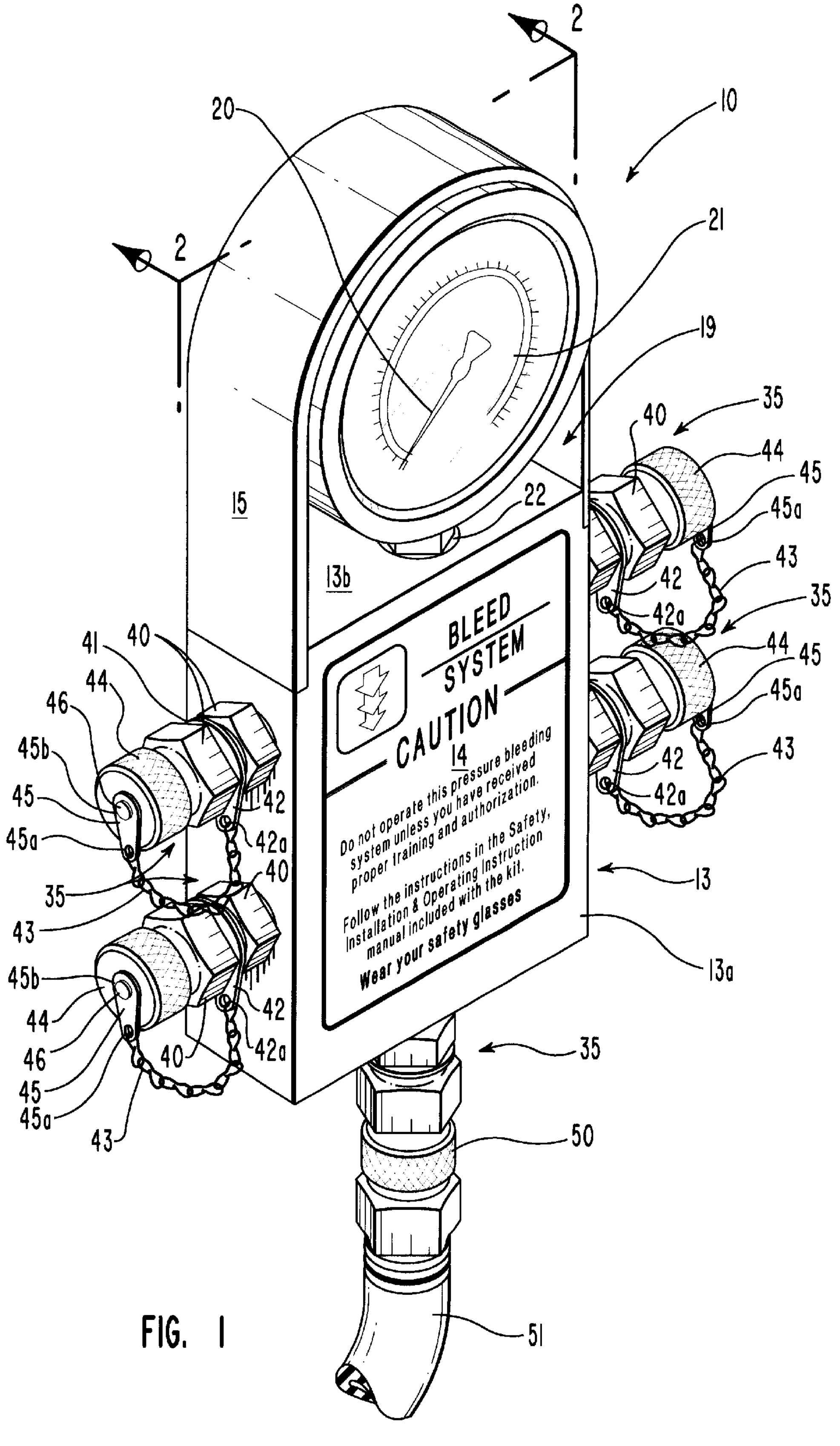
FIG. 1 is a side elevation perspective view of a preferred embodiment of the invention in a safety bleed assembly showing a high pressure line connected onto a lower or bottom high pressure port.
Figure 2:
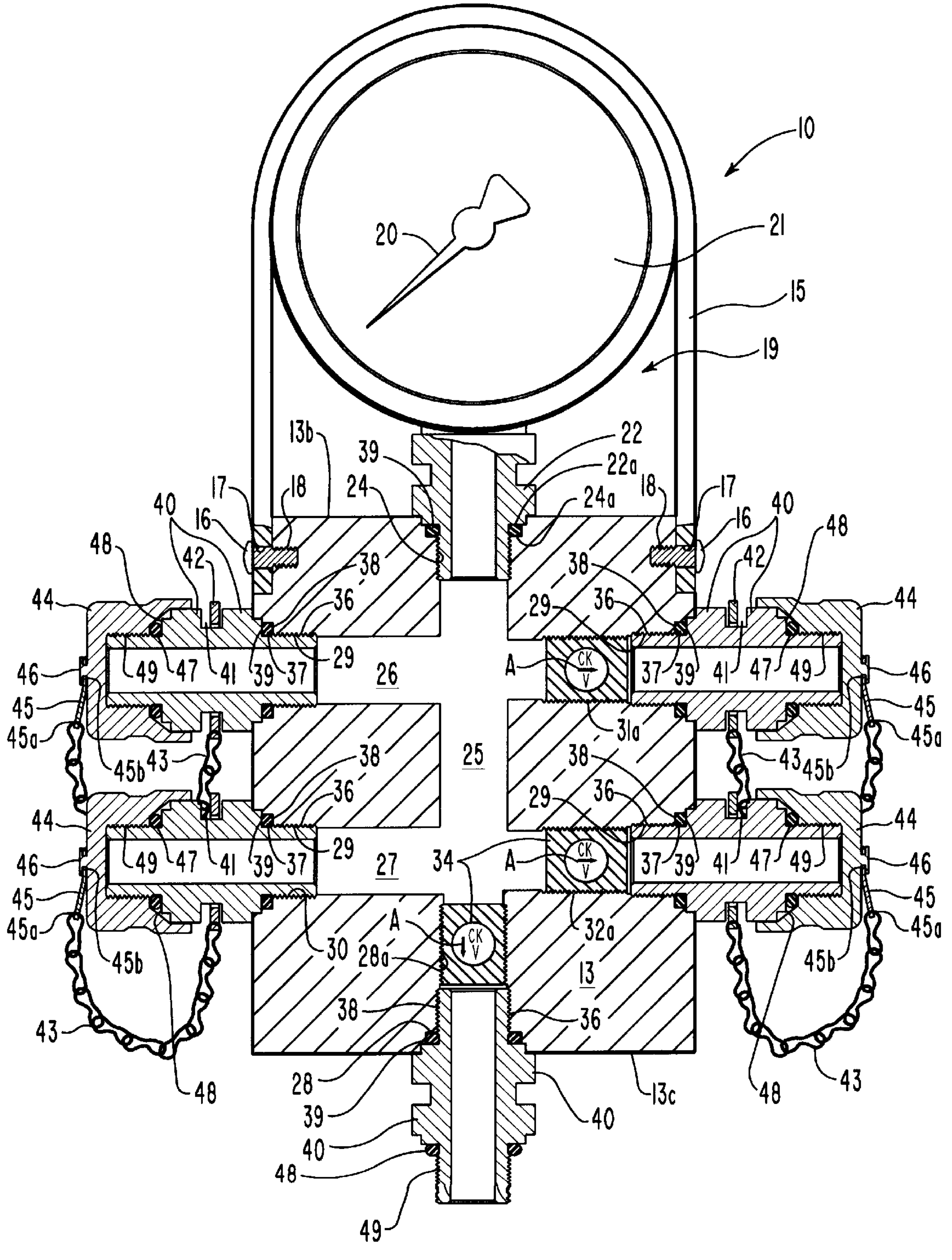
FIG. 2 is a front elevation sectional view taken along the line 2—2 of FIG. 1 showing the assembly body interior as containing flow passages.
Figure 3:
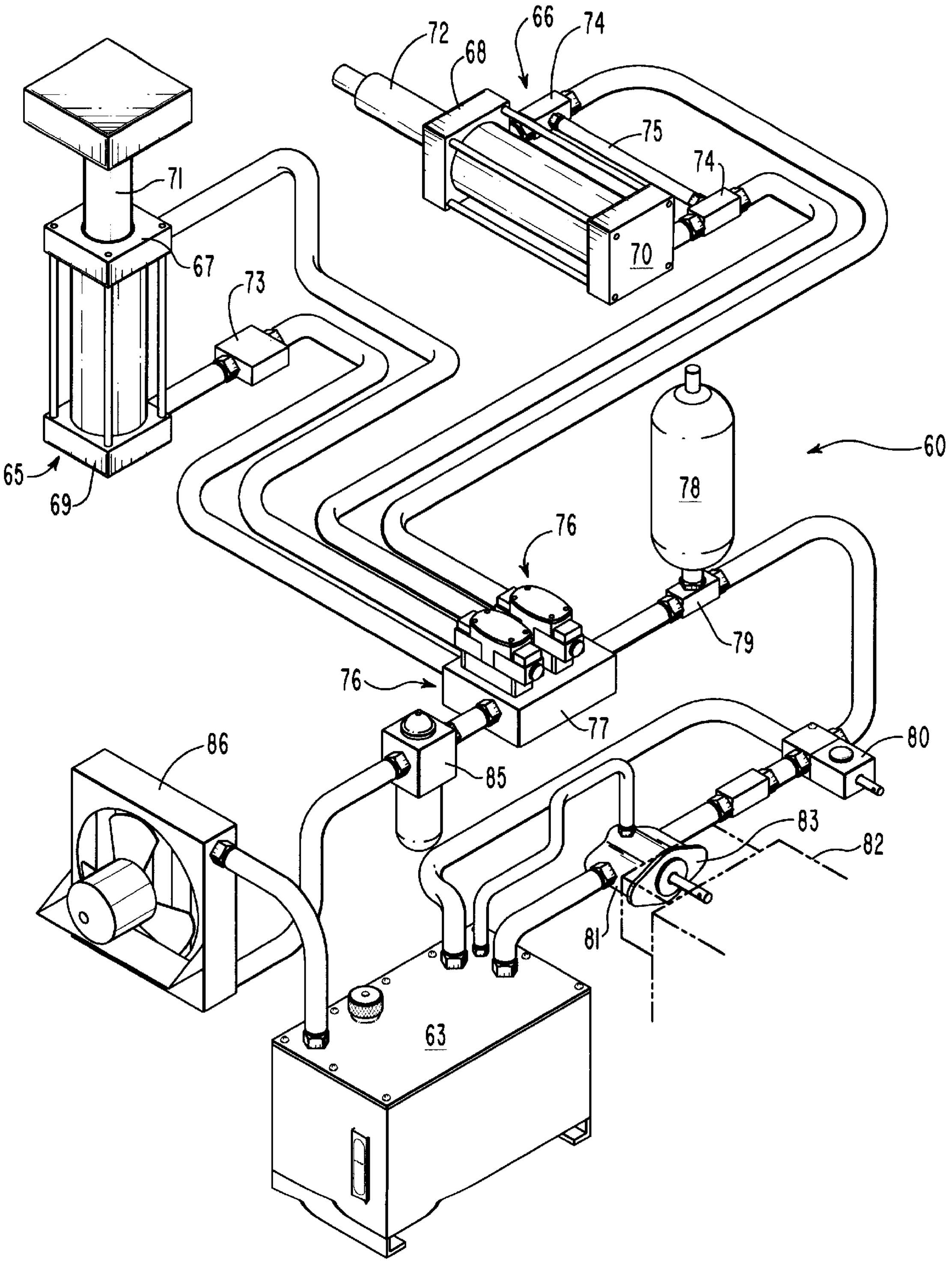
FIG. 3 (PRIOR ART)
FIG. 3 shows a schematic layout of a hydraulic actuator system that includes a connected reservoir and system components and is identified as prior art in that it has not been configured to receive the safety bleed assembly of FIGS. 1 and 2, by an installation of high pressure check/bleed connectors into system lines or hoses.

The invention in a safety bleed assembly 10, hereinafter referred to as bleed assembly, is shown best in FIGS. 1 and 2. The bleed assembly 10 is preferably for connection into lines or hoses of a hydraulic system 60, shown in FIGS. 4 and 5, that has been fitted with check/bleed connections to connect through lines or hoses 51 to the bleed assembly 10. The hydraulic system 60 before it is configured to connect to the bleed assembly 10, is shown in FIG. 3, which Figure is here identified as prior art. Shown in FIG. 1, the bleed assembly 10 includes a housing 12, shown as a rectangular block body 13, that preferably includes, on a front face 13*a*, a card 14 containing instructions, cautions, and the like, thereon that relate to operation of the bleed assembly. The plate 14 is, of course, an optional inclusion and the instructions and cautions, as shown, are here provided as examples only of information as may be written thereon. Shown in FIGS. 1 and 2, a protective cover 15, that is shown formed as an arch to extend over the block top end 13*b*, is connected at its ends to the body 13 top end as by fitting screws 16 through holes 17 that have been formed through the cover 15 end sections and are turned into threaded holes 18 formed into the body. The protective cover 15 is fit over to maintain a pressure gauge 19, that is preferably a conventional gauge as is suitable for measuring fluids under pressure. Such gauge is preferably a glycerine filled Bourdon tube type gauge that is capable of measuring pressures of from 0 to 3,000 psi and a gauge manufactured by Lenz Corp., identified as a pressure gauge, has been used successfully for the invention. The gauge is read by an operator observing positioning of a pivoting radial arm 20 turned over a scale 21, as shown in FIGS. 1 and 2. The pressure that is read off of the gauge 15 is the pressure within the body 13 when the assembly 10 is connected through a line or hose 51 to a line, tube or hose of a section of hydraulic system 60. To couple the pressure gauge into the body 13, a gauge stem 22 is provided that is threaded at 23 and is stepped outwardly at 22*a* into a shelf above the threads, that is turned into a threaded opening 24 formed into the body top end 13*b*. The opening 24, as shown, is itself stepped outwardly into a seat 24*a* to contain an O-ring 39, as shown in FIG. 2. The O-ring is for sealing the gauge stem 22 in the opening 24 against fluid leakage. The threaded opening 24 is at the top end of an open center vertical passage 25 that is formed through the body 13 and extends from top end 13*b* to bottom end 13*c*.

Shown in FIG. 2, the body 13, in addition to the center vertical passage 25, preferably includes a pair of parallel open horizontal top and bottom passages 26 and 27, respectively, that are spaced apart from one another and are formed to cross and open into the center vertical passage 25. Like the threaded top end 24 of center vertical passage 25, the opposite or lower vertical passage 25 end 28 is also threaded, as are the horizontal passage 26 and 27 ends 29, 30, 31, and 32, respectively. Further, each passage end is stepped outwardly into a shelf that is to serve as a seat 38 for receiving an O-ring 39. The vertical passage lower end 28 and the horizontal passage threaded ends 31 and 32, respectively, are arranged as high pressure ports for connection to high pressure sources and accordingly are each stepped slightly inwardly and threaded at 28*a*, 31*a* and 32*a*, respectively, for receiving a check valve 34 turned therein. The check valves 34 are provided to check or prohibit flow out of the passages, as illustrated by small arrows A, with each check valve turned into the passage end ahead of a port 35 fitted therein. Ports 35 are preferably alike and each is for fitting into a body passage threaded opening. Accordingly, the ports may be the same manufacture, or of different manufacture within the scope of this disclosure. In practice, a check valve 34, manufactured by Kepner Product Co. identified as a check valve, has been used successfully for the invention, as has a port 35 manufactured by Kepner Product Co., identified as a check valve, though, of course, other check valves and ports manufactured by others could be so used within the scope of this invention.

The respective ports 35, as shown in FIGS. 1 and 2, adjacent to a threaded neck 36 of each are stepped outwardly into a shelf 37. The shelf 37 is to align with the seat 38 that is formed around an outer edge of each of the passages, 25, 26, and 27, respectively, with the area between the shelf 37 and seat 38 to contain O-ring 39. The O-ring 39, as described above with respect to gauge port 22, is preferably like and may be the same manufacture as port 35. So arranged, when a port 35 or gauge port 22 is turned into the threaded end of the passages 25, 26, and 27, the respective port shelves 37 and gauge port shelf 22*a*, respectively, compress the O-ring 39 against the seat 38 and fitting seat 24*a*, respectively. The ports 35 and fitting 22, respectively, are thereby sealed in the ends 24, 28, 29, 30, 31, and 32, of the vertical and horizontal passages 25, 26, and 27, respectively, prohibiting leakage of fluid under pressure therefrom.

The ports 35 that are secured over the ends 28, 29, 30, 31, and 32 of the vertical and horizontal passages 25, 26, and 27, respectively, are each shown to have a sided outer body surface 40, shown herein as a hexagon cross section, for receiving a conventional wrench fitted thereto, or the like, that is for turning the port into a passage end. Preferably, a center slot 41 is formed into each of the sided surfaces that is for receiving a mounting tab 42 fitted therein. Each mounting tab 42 is shown to include a hole 42*a* formed through its end wherethrough an end of a chain 43 is shown secured with the chain opposite end connected into a hole 45*a* that has been formed through an outer end of a bar 45. The bar 45 is, in turn, connected, at its head end 45*b* to a center of a screw on cap 44, as by a rivet 46. Shown in FIG. 2, each cap 44 is arranged to receive an inner O-ring 47 mounted therein that is for engaging a port outer shelf 48 to seal thereagainst when the cap is tightened onto to close off a port threaded outer end 49. So arranged, with the caps 44 secured onto the port 35 threaded ends 49, the body 13 will be pressure tight. Shown in FIG. 1, with the bleed assembly connected at port 35, to a hose 51 that contains fluid under pressure, and with the caps 44 fitted over the other ports 35, as shown in FIGS. 1 and 2, pressure in line 51 will be displayed on pressure gauge 19.

The respective ports 35 that are arranged, respectively, in the end 28 of vertical passage 25 and the ends 31 and 32 of the horizontal passages 26 and 27 each follow a check valve 34 that has been turned therein. So arranged, the ports 35 and check valves 34 function as high pressure inlet ports. The check valves 34 are each a one way valve, constructed to allow fluid under pressure to pass into a passage but prohibiting a back flow therethrough, as illustrated by arrow A. Distinct therefrom, the ports 35 that are fitted into horizontal passage 26 and 27 ends 29 and 30, respectively are designated as low pressure ports that are open therethrough to allow a free flow out from the body 13. So arranged, the ports 35 maintained in passage ends 28, 31, and 32 that include the described check valves 34 are high pressure ports that are intended to be connected into hydraulic system lines or hoses for passing fluid under pressure therefrom. The port and caps are preferably color coded, as are check/bleed connectors 61 of the hydraulic system 60 whereto they are connected, to identify an operator their function. In practice these ports, caps and connectors are painted red to indicate danger. Whereas, the ports 35 mounted in passage ends 29 and 30, that do not include check valves 34, are set out as being low pressure ports and are also color coded as are their caps, and the check/bleed connectors 62 of the hydraulic system 60 whereto they are connected. These ports, caps and connectors, as set out, are for connection to drain fluid from the bleed assembly 10 into a low pressure line that ultimately connects to pass fluid back into a system reservoir, or the like. In practice the low pressure ports 35, their caps, and check/bleed connectors 62, are preferably painted blue to identify them as low pressure ports.

Figure 4:
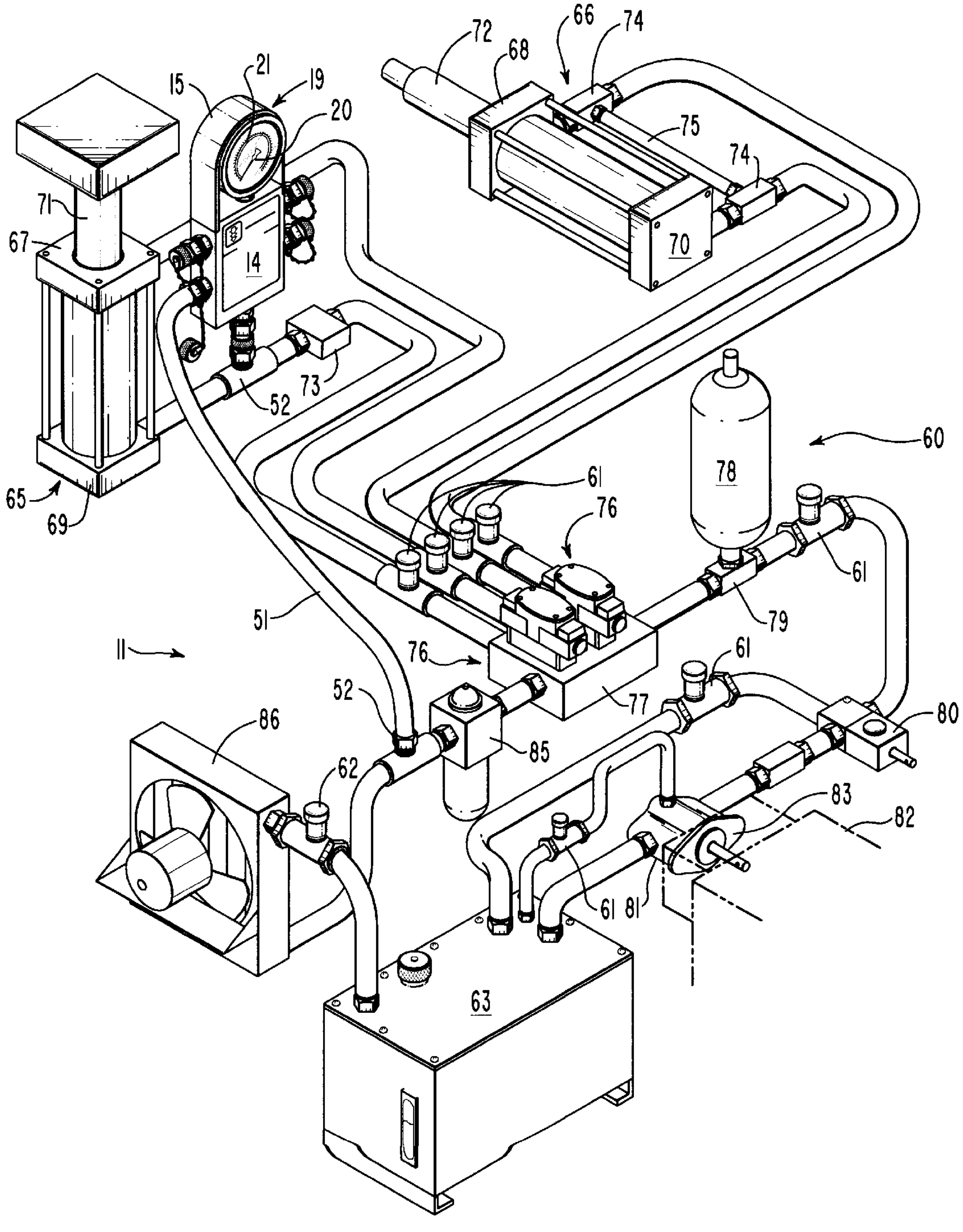
FIG. 4 shows the schematic of FIG. 3 wherein have been added a number of check/bleed connectors in lines or hoses of the system where pressure may be present and into lines or hoses known to be at low pressure, and showing a line or hose extending from a low pressure port of the safety bleed assembly of FIG. 1 to vent fluid ultimately back to a system reservoir, and showing a bottom high pressure port of the safety bleed assembly connected into a line or hose that is between a hydraulic system actuator, shown in a vertical attitude, and a counter balance valve that may be energized.
Figure 5:
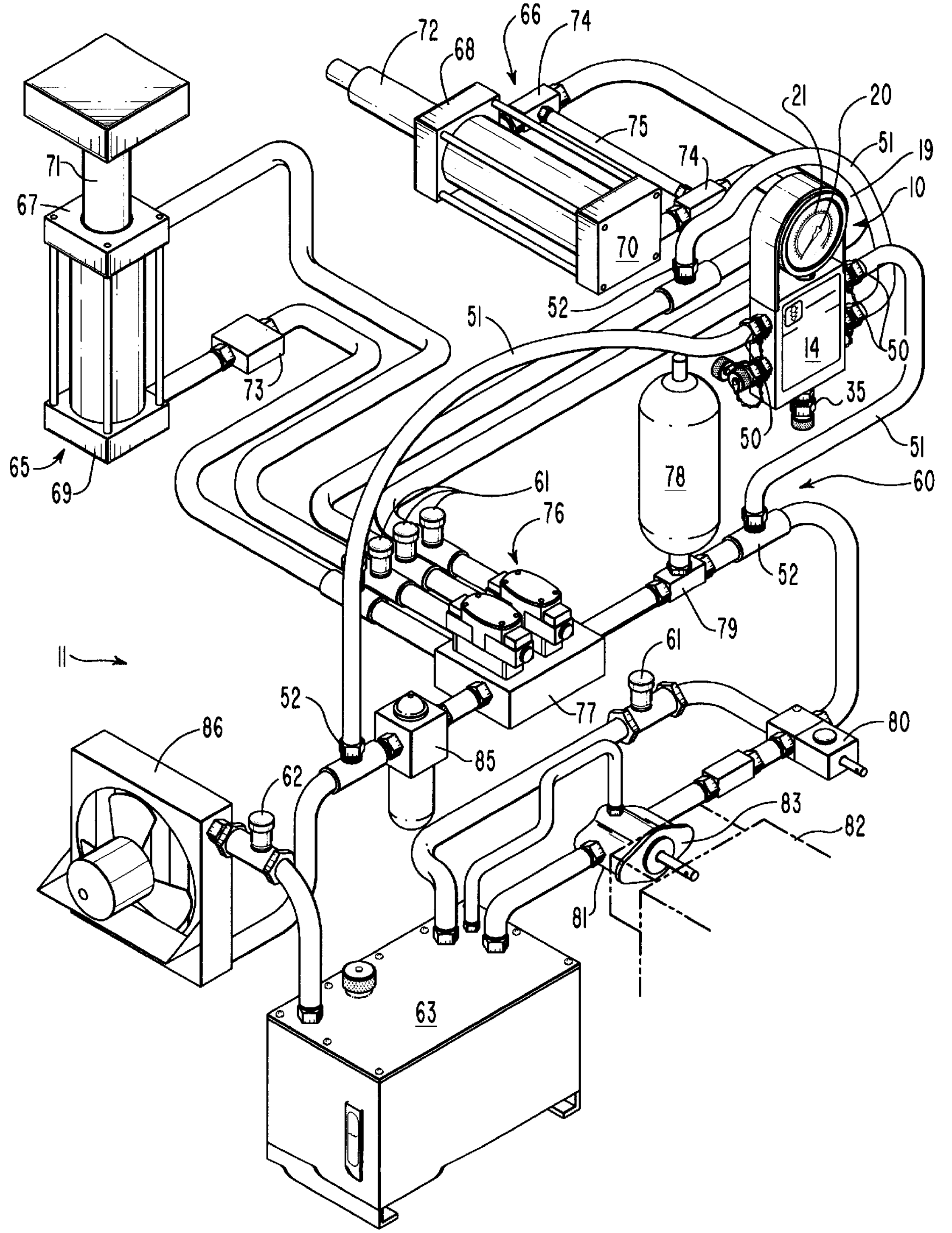
FIG. 5 shows the schematic of FIG. 3 wherein check/bleed connectors have been mounted and showing the low pressure port of the safety bleed assembly connected through a line or hose to a low pressure line to vent hydraulic fluid back to the system reservoir, and showing two side high pressure ports of the safety bleed assembly connected, respectively, through lines or hoses, between an accumulator and a pressure relief valve and an actuator, shown in a horizontal attitude, and a directional valve, respectively, illustrating a use of the invention for connecting system high pressure lines or hoses to both the side high pressure ports for venting separate hydraulic system lines.

FIG. 3, identified as prior art, shows a schematic of a hydraulic system 60 before it has been configured to connect to the bleed assembly 10 of the invention. FIGS. 4 and 5, as set out and described hereinbelow, show the same hydraulic system 60 after it has been altered by an inclusion the of check/bleed connectors 61 in system high pressure lines as may remain in a pressurized state after the hydraulic system is shut off, and with low pressure check/bleed connectors 62 connected into lines that are known to be at zero or low pressure that are for connection to lines or hoses that ultimately drain fluid back into a system reservoir 63. The check/bleed connectors 61 and 62 are preferably standard check valve type components as are utilized in hydraulic systems to contain pressure within a hydraulic line until released by receipt of an appropriate line or hose fitting 52 turned thereon. For the invention check/bleed connectors known as a coupling, manufactured by Stautt Corp., have been used successfully as hose connectors 52, and are arranged for connecting to ends of lines or hoses 51, as set out above and described in detail hereinbelow. The hose connector 52 is arranged to fit onto a check/bleed connector 61 or 62, and preferably includes a center stem, or the like, not shown, that is to fit into the stem or neck of a check/bleed connector 61 or 62. The fitting of the hose connector stem onto the check/bleed connector neck opens a valve portion of the connector neck, not shown, to pass contained fluid under pressure.

The bleed assembly 10 of the invention is for arrangement in a typical hydraulic system 60, like that shown in FIG. 3. Which hydraulic system 60 is shown in FIGS. 4 and 5, as having been modified to include check/bleed connectors 61 in lines or hoses of the hydraulic system 60 of FIG. 3 wherein a pressurized state may exist after system shutdown, with check/bleed connectors 62 shown fitted into low pressure lines. So arranged, bleed assembly 10 high pressure ports 35 can be connected through lines or hoses 51 to check/bleed connectors 61 to vent or bleed fluid under pressure through the bleed assembly 10 that passes therefrom out low pressure ports 35, through lines or hoses 51, and into low pressure check/bleed connectors 62 arranged in low pressure sections of the hydraulic system 60. Prior to which connection of such check/bleed connector 61 through line or hose 51 to a bleed assembly 10 high pressure port 35, a line or hose 51 is first connected between bleed assembly 10 low pressure port 35 and a low pressure check/bleed connector 62 maintained in a low pressure line of the hydraulic system 60, to pass fluid back into system reservoir 63. With the low pressure side of the bleed assembly 10 so connected, as shown in FIG. 4, and with the other low pressure port 35 closed off by a cap 44, a high pressure port 35 can be connected through line or hose 51, to a check/bleed connector 61 that is arranged in a hydraulic system 60 line or hose that may be under pressure, for venting hydraulic energy through the bleed assembly 10 and back to the system reservoir 63.

The hydraulic system 60, as shown in FIGS. 3 through 5, includes a vertical actuator 65 and a horizontal actuator 66 whereto lines or hoses are connected into both top ends 67 and 68, respectively, and bottom ends 69 and 70, respectively, the actuators operated on receipt of fluid under pressure, to move pistons 71 and 72, respectively. The vertical actuator 65 lower end 69 is shown pressurized through a counter balance valve 73 that, upon system shut off, will hold pressure to maintain the piston 71 in an extended attitude. So arranged, even after shutdown of the hydraulic system 60, fluid under pressure will remain in this line or hose. In FIG. 4, sections of the hydraulic system 60 are shown connected through lines or hoses 51 to the bleed assembly 10 of the invention. Shown therein, a line or hose is maintained between the vertical actuator bottom end 69 and counter balance valve 73 for venting fluid under pressure therefrom to pass through the bleed assembly 10 line or hose 51 and exiting a low pressure connector 62 port to flow through a second filter 85 into a low pressure check/bleed connector 62 located between a filter 85 and heat exchanger 86 to ultimately pass back into a system reservoir 63. Additional locations wherein high pressure may exist after system shut down are sections between horizontal actuator 66 top and bottom ends 68 are shown connected to pilot operated valves 74 that, in turn, are connected together by a cross pipe 75 and are, in turn, connected by lines or hoses to one of a pair of directional valves 76. So arranged, fluid under pressure may be trapped on either side of the pilot operated valves. Lines or hoses that contain trapped fluid are also shown connecting the counter balance valve 73 and top end 67 of the vertical actuator 65 to another pair of directional valves 76 that, as shown, are mounted onto a block 77.

The pilot operated valves 74 and cross pipe 75, may contain pressure trapped between the horizontal actuator and such component and accordingly a check/bleed connector 61, not shown, may be connected in the line or hose from the horizontal actuator 66 and pilot check valve 74 to meet a potential need to vent pressure from this section of hydraulic system 60.

The lines or hoses that connect into the directional valves 76 may also be under pressure and a check/bleed connection 61 is shown fitted into each line for venting that line or hose individually, as set out hereinbelow with respect to a discussion of FIG. 5. FIGS. 4 and 5 show a vent line or hose that is connected to provide a flow out of block 77 and through the filter 85 with that connects to a heat exchanger 86, that is a low pressure section or portion of hydraulic system 60. The heat exchanger 86, in turn, is connected by a line or hose to vent fluid back to filter 85 then to reservoir 63. During operation of the hydraulic system 60, after the actuators 65 and 66 are fully pressurized, the directional valves 76 are operated to direct fluid through filter 85, and into the heat exchanger 86 that is at low or zero pressure for cooling and to flow back to the reservoir 63. With the hydraulic system shut down, the directional valves 76 may be positioned to retain pressure in a line or hose to an accumulator 78 and from the accumulator a T connector 79 that is preferably open therethrough, and accordingly a check/bleed connector 61 is fitted in this line. In FIG. 5, a line or hose 51 is shown connected into the check/bleed connection 61 to pass fluid through the bleed assembly 10 and to a low pressure check/bleed connector 62 that is upstream from the heat exchanger 86. So arranged, fluid as contained in the hydraulic system 60 between the directional valves 76 on block 77 and a pressure relief valve 80 is vented through the bleed assembly 10.

From the pressure relief valve 80 the hydraulic system divides into flow paths that connect, respectively, to a low pressure line wherein a low pressure check/bleed connector 62 is fitted to vent to the reservoir 63, and through a check valve 84 to a pump 81 that is operated by a connected motor, shown as a broken line box 82, to turn a pump shaft 83. The output of pump 81 is to travel through a check valve 84 and to the pressure relief valve 80. Accordingly, even with the pump 81 stopped, as by a turning off of the motor 82, pressure may still exist between the pressure relief valve 80 and check valve 84 and accordingly a high pressure check/bleed valve 61, not shown, is preferably included therebetween.

As set out above, FIGS. 4 and 5 show a typical hydraulic system 60 wherein lines or hoses may contain fluid under pressure after a pump 81 has been shut off, and wherein high pressure check/bleed valves 61 are installed and with low pressure check/bleed connectors 62 fitted in lines or hoses that are at zero or low pressure, with fluid therein ultimately draining back to reservoir 63. It should be understood that the hydraulic system 60 is shown herein for illustration only, and the invention is in the bleed assembly 10 that is not limited for use with any particular hydraulic system. Except, of course, any hydraulic system to be vented by the bleed assembly must be fitted with high and low pressure check/bleed connectors 61 and 62. In practice, the connection of the bleed assembly 10 first to low pressure check/bleed connectors 62 and then through individual check/bleed connectors 61 continues around the hydraulic system 60 until all the sections thereof that could contain fluid under pressure have been vented back to reservoir 63. Whereafter, the entire hydraulic system 60 can be safely opened for repair or replacement of individual components.

While a preferred embodiment of my invention in a bleed assembly for installation in a hydraulic system that has been appropriately modified to receive the bleed assembly connected therein for bleeding or relieving pressure from sections of the hydraulic system has been shown and described herein. It should, however, be understood that the present disclosure is made by way of example only and that the invention may be configured and operated differently than as shown and described without departing from the subject matter coming within the scope of the following claims, and a reasonable equivalency thereof, which claims I regard as my invention.

I claim:

1. A safety bleed assembly for testing for a presence of hydraulic pressure in a hydraulic system comprising, a body that is a single portable unit of a size and weight to be handheld and conveniently transported by a single individual having at least a first passage open therethrough to opposite open ends and both said first passage ends are formed to receive an open port mounted therein and including, in one said first passage end, a check valve means to provide a one way flow only of a fluid under pressure into said first passage, which said port with check valve means are a pressure port arranged for releasable connection to a high pressure source, and said other first passage end includes a port fitted therein for releasable connection to a low pressure source as a low pressure port; a second center vertical passage formed in said body that crosses and opens into said first passage and is open at a surface of said body; pressure sensing means secured to an end of said second passage for displaying pressure as is present in said first passage; a third passage that formed in the body extending between opposite sides of said body and is parallel to the first passage and crosses the second passage and said third passage includes ports maintained in opposite ends thereof, with one of said ports being a second high pressure port that includes a check valve means fitted therein for providing a one way flow only of a fluid under pressure that is directed into said third passage; means for connecting said first and second high pressure ports to a connector means of lines or hoses for releasable connection into a section or sections of a hydraulic system; and means for releasably connecting said low pressure port or ports to a vent, line or hose.

2. A safety bleed assembly as recited in claim 1, wherein the body is a rectangular block center vertical second passage that is formed therethrough and mounts, in an end of said second passage that is in a block top surface, a pressure gauge as the pressure sensing means and includes an open port and a check valve means in opposite end of said second passage second end in a block bottom surface as a second high pressure port that allows a one way flow only of a fluid under pressure into said second passage and into said first passage.

3. A safety bleed assembly as recited in claim 2, further including a removable cap for turning over in sealing engagement with each open port; and each open port and cap are color coded respectively, to indicate whether or not a particular port is for connection to a source of fluid under pressure.

4. A safety bleed assembly as recited in claim 1, wherein the first passage and the third passage ends with ports and adjacent check valve means, are arranged in one side of the body, and the opposite first passage and third passage ends with ports are arranged in the opposite body side.

5. A safety bleed assembly as recited in claim 1, wherein the line or hose for connecting said ports with check valve means to a source of fluid under pressure is capable of containing fluid under pressure and includes a first connector means maintained on one end of said line or hose for releasable coupling, in sealing engagement, onto one of the high pressure ports, and the other end of said line or hose includes a second connector means that is for releasable connection to a check/bleed connector means as has been mounted in a line or hose of a hydraulic system, which said second connector means is arranged to open said check/bleed connector means when installed thereon.

6. A safety bleed assembly as recited in claim 5, further including at least one high pressure check/bleed connector means that is mounted in a section hydraulic system that may contain fluid under pressure after the hydraulic system has been shut off; and at least one low pressure check/bleed connector means that is mounted in a section of said hydraulic system that is at zero or low pressure when said hydraulic system has been shut off.

* * * * *